(12) United States Patent
Hiro et al.

(10) Patent No.: US 11,119,387 B2
(45) Date of Patent: Sep. 14, 2021

(54) IMAGING DEVICE, IMAGING DEVICE CONTROL METHOD, AND PROCESSING DEVICE

(71) Applicant: SONY CORPORATION, Tokyo (JP)

(72) Inventors: Daisuke Hiro, Kanagawa (JP);
Katsunari Oda, Kanagawa (JP);
Shohei Sakaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 16/603,316

(22) PCT Filed: Apr. 17, 2018

(86) PCT No.: PCT/JP2018/015798
§ 371 (c)(1),
(2) Date: Oct. 7, 2019

(87) PCT Pub. No.: WO2018/194043
PCT Pub. Date: Oct. 25, 2018

(65) Prior Publication Data
US 2021/0116678 A1  Apr. 22, 2021

(30) Foreign Application Priority Data
Apr. 17, 2017 (JP) .............................. JP2017-081528

(51) Int. Cl.
*G03B 7/16* (2021.01)
*H04N 5/235* (2006.01)
(Continued)

(52) U.S. Cl.
CPC .............. *G03B 7/16* (2013.01); *G03B 13/36* (2013.01); *G03B 15/03* (2013.01); *H04N 5/235* (2013.01)

(58) Field of Classification Search
None
See application file for complete search history.

(56) References Cited

U.S. PATENT DOCUMENTS

| 6,904,233 B2 * | 6/2005 | Fukui | ................... G03B 15/05 |
| | | | 396/157 |
| 6,928,239 B2 * | 8/2005 | Fukui | ...................... G03B 7/16 |
| | | | 396/61 |

(Continued)

FOREIGN PATENT DOCUMENTS

| JP | 06-289280 A | 10/1994 |
| JP | 2002-207159 A | 7/2002 |

(Continued)

OTHER PUBLICATIONS

International Search Report and Written Opinion of PCT Application No. PCT/JP2018/015798, dated Jul. 24, 2018, 09 pages of ISRWO.

*Primary Examiner* — Clayton E. LaBalle
*Assistant Examiner* — Leon W Rhodes, Jr.
(74) *Attorney, Agent, or Firm* — Chip Law Group

(57) ABSTRACT

With a pre-light emission quantity adjusted to an appropriate value, the accuracy of light control for main light emission can be enhanced. A first pre-light emission quantity is obtained with no use of distance information. An appropriate light emission quantity is obtained with use of distance information, and a second pre-light emission quantity is obtained by decreasing the appropriate light emission quantity by a predetermined quantity according to a photometric wave detection capacity. A final pre-light emission quantity is obtained by mixing the first pre-light emission quantity and the second pre-light emission quantity, at a ratio corresponding to the accuracy of the distance information used to obtain the appropriate light emission quantity.

16 Claims, 10 Drawing Sheets

(51) Int. Cl.
*G03B 13/36* (2021.01)
*G03B 15/03* (2021.01)

(56) References Cited

U.S. PATENT DOCUMENTS

| | | | |
|---|---|---|---|
| 7,697,835 B2* | 4/2010 | Sasaki | G03B 15/05 |
| | | | 396/157 |
| 9,081,257 B2* | 7/2015 | Miyazaki | H04N 5/2354 |
| 2004/0170420 A1 | 9/2004 | Fukui | |
| 2010/0046936 A1 | 2/2010 | Takahashi | |
| 2010/0232778 A1 | 9/2010 | Gwak et al. | |
| 2013/0057740 A1 | 3/2013 | Takaiwa | |

FOREIGN PATENT DOCUMENTS

| | | |
|---|---|---|
| JP | 2004-258430 A | 9/2004 |
| JP | 2005-173254 A | 6/2005 |
| JP | 2005-184508 A | 7/2005 |
| JP | 2006-053493 A | 2/2006 |
| JP | 2008-052210 A | 3/2008 |
| JP | 2009-288657 A | 12/2009 |
| JP | 2013-054135 A | 3/2013 |
| KR | 10-2010-0023597 A | 3/2010 |
| KR | 10-2010-0104050 A | 9/2010 |

\* cited by examiner

IMAGING DEVICE, IMAGING DEVICE CONTROL METHOD, AND PROCESSING DEVICE

CROSS REFERENCE TO RELATED APPLICATIONS

This application is a U.S. National Phase of International Patent Application No. PCT/JP2018/015798 filed on Apr. 17, 2018, which claims priority benefit of Japanese Patent Application No. JP 2017-081528 filed in the Japan Patent Office on Apr. 17, 2017. Each of the above-referenced applications is hereby incorporated herein by reference in its entirety.

TECHNICAL FIELD

The present technique relates to an imaging device, an imaging device control method, and a processing device, and more specifically, to an imaging device, etc., configured to perform light control for main light emission on the basis of a result of pre-light emission (preliminarily light emission).

BACKGROUND ART

PTL 1 describes a solution of obtaining distance information, setting an ISO sensitivity and a pre-light emission quantity so as to perform pre-light emission, adjusting the ISO sensitivity and a main light emission quantity in a case where reflection light exceeds a photometry possible range, and performing main light emission such that the photometry possible range is not exceeded.

CITATION LIST

Patent Literature

[PTL 1]
Japanese Patent Laid-Open No. 2006-053493

SUMMARY

Technical Problem

For distance information, a perfect accuracy is not actually guaranteed. In a case where distance information having poor accuracy is used, the accuracy of light control for main light emission is deteriorated.

In addition, pre-light emission reflection light, which is photometry information, includes an external light component. Therefore, in a case where the luminance of external light is high, the ratio of the pre-light emission reflection light component itself, in the photometry quantity is small, whereby the S/N ratio is deteriorated, and thus, the accuracy of light control for main light emission is deteriorated. For this reason, unless the luminance of external light is taken into consideration, how much an excess of a photometry possible range is cannot be appropriately calculated. Thus, even when the ISO sensitivity or the light emission quantity is adjusted, it is highly possible that the photometry possible range is exceeded again during main light emission.

An object of the present technique is to enhance the accuracy of light control for main light emission by adjusting a pre-light emission quantity to an appropriate value.

Solution to Problem

A concept of the present technique is an imaging device (processing device) including
a control unit that controls a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of obtaining a final pre-light emission quantity from the first pre-light emission quantity and the second pre-light emission quantity, based on a ratio according to an accuracy of the distance information used to obtain the appropriate light emission quantity.

In the present technique, the first process, the second process, and the third process are controlled by the control unit. In the first process, the first pre-light emission quantity is obtained with no use of distance information. In the second process, the appropriate light emission quantity is obtained with use of distance information, and the second pre-light emission quantity is obtained by decreasing the appropriate light emission quantity by the predetermined quantity according to the photometric wave detection capacity. In the third process, the final pre-light emission quantity is obtained from the first pre-light emission quantity and the second pre-light emission quantity, based on a ratio corresponding to the accuracy of the distance information used to obtain the appropriate light emission quantity.

For example, in the third process, the accuracy of distance information may be determined based on information indicating an error range of a distance indicated by the distance information, and, when the error range falls within a range equal to or less than a first threshold, the second pre-light emission quantity may be directly used as the final pre-light emission quantity, when the error range falls within a range equal to or greater than a second threshold which is greater than the first threshold, the first pre-light emission quantity may be directly used as the final pre-light emission quantity, and, when the error range falls within a range greater than the first threshold but less than the second threshold, the first pre-light emission quantity and the second pre-light emission quantity may be mixed such that a ratio of the second light emission quantity is gradually decreased with an increase of the error range, and the resultant quantity may be set as the final pre-light emission quantity.

For example, the control unit may be configured to acquire the distance information from a lens device. For example, the control unit may be configured to acquire, from the lens device, the information indicating an error range of a distance indicated by the distance information. In this case, the control unit may be configured to correct, based on environmental temperature, the information that is acquired from the lens device and that indicates an error range of a distance indicated by the distance information, and uses the corrected information. Since the information indicating an error range is corrected based on the environmental temperature, and is used, the accuracy of the distance information can be more appropriately determined.

In addition, for example, a holding unit that holds information regarding an error range corresponding to distance information acquired from the lens device, may be further included, and the control unit may be configured to acquire, from the holding unit, information indicating an error range of a distance indicated by the distance information. In this case, the control unit may be configured to correct, based on environmental temperature, the information that is acquired from the holding unit and that indicates an error range of a distance indicated by the distance information, and uses the corrected information. Since the information indicating the error range is corrected based on the environmental temperature, and is used, as described above, the accuracy of the distance information can be more appropriately determined.

For example, a communication unit for acquiring the information regarding an error range corresponding the lens device from an external server, so as to hold the information in the holding unit, may be further included. Moreover, for example, a user operation unit to which information regarding the error range corresponding to the lens device is inputted so as to be held in the holding unit, may be further included.

As described above, in the present technique, the first pre-light emission quantity and the second pre-light emission quantity are mixed at the ratio corresponding to the accuracy of the distance information, and the resultant quantity is set as the final pre-light emission quantity. Accordingly, an influence of a poor accuracy of distance information regarding pre-light emission can be lessened, whereby the accuracy of light control for main light emission can be enhanced.

Note that, in the present technique, for example, the control unit may be configured to further control a fourth process of adjusting, according to an external light luminance, the predetermined quantity by which the appropriate light emission quantity is decreased to obtain the second pre-light emission quantity. In this case, for example, in the fourth process, the predetermined quantity may be adjusted to be small when a photometry component of the external light luminance is greater than a photometry component of pre-light emission performed at the second pre-light emission quantity. Since the predetermined quantity is adjusted according to the external light luminance, as described above, deterioration of the S/N ratio of a photometry component of pre-light emission in the case where the external light luminance is high can be prevented, whereby the accuracy of light control for main light emission can be enhanced.

In addition, another concept of the present technique is an imaging device including a control unit that controls a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of adjusting, according to an external light luminance, the predetermined quantity by which the appropriate light emission quantity is decreased to obtain the second pre-light emission quantity.

In the present technique, the first process, the second process, and the third process are controlled by the control unit. In the first process, the first pre-light emission quantity is obtained with no use of distance information. In the second process, the appropriate light emission quantity is obtained with use of distance information, and the second pre-light emission quantity is obtained by decreasing the appropriate light emission quantity by the predetermined quantity according to the photometric wave detection capacity.

In the third process, the predetermined quantity by which the appropriate light emission quantity is decreased to obtain the second pre-light emission quantity, is adjusted according to the external light luminance. For example, in the third process, the predetermined quantity may be adjusted to be small when a photometry component of the external light luminance is greater than a photometry component of pre-light emission performed at the second pre-light emission quantity.

As described above, in the present technique, the predetermined quantity by which the appropriate light emission quantity is decreased to obtain the second pre-light emission quantity, is adjusted according to the external light luminance. Therefore, deterioration of the S/N ratio of a photometry component of pre-light emission in the case where the external light luminance is high, can be prevented, whereby the accuracy of light control for main light emission can be enhanced.

Advantageous Effects of Invention

According to the present technique, the accuracy of light control for main light emission can be enhanced with a pre-light emission quantity adjusted to an appropriate value. Note that the effects described herein are exemplifications, and thus, the present technique is not limited thereto. An additional effect may be further provided.

DESCRIPTION OF EMBODIMENT

Hereinafter, an embodiment for carrying out the invention (hereinafter, referred to as "embodiment") will be described. Note that the descriptions are given in the following order:
1. Embodiment
2. Modification

1. Embodiment

[Configuration Example of Imaging System]

Figure 1:
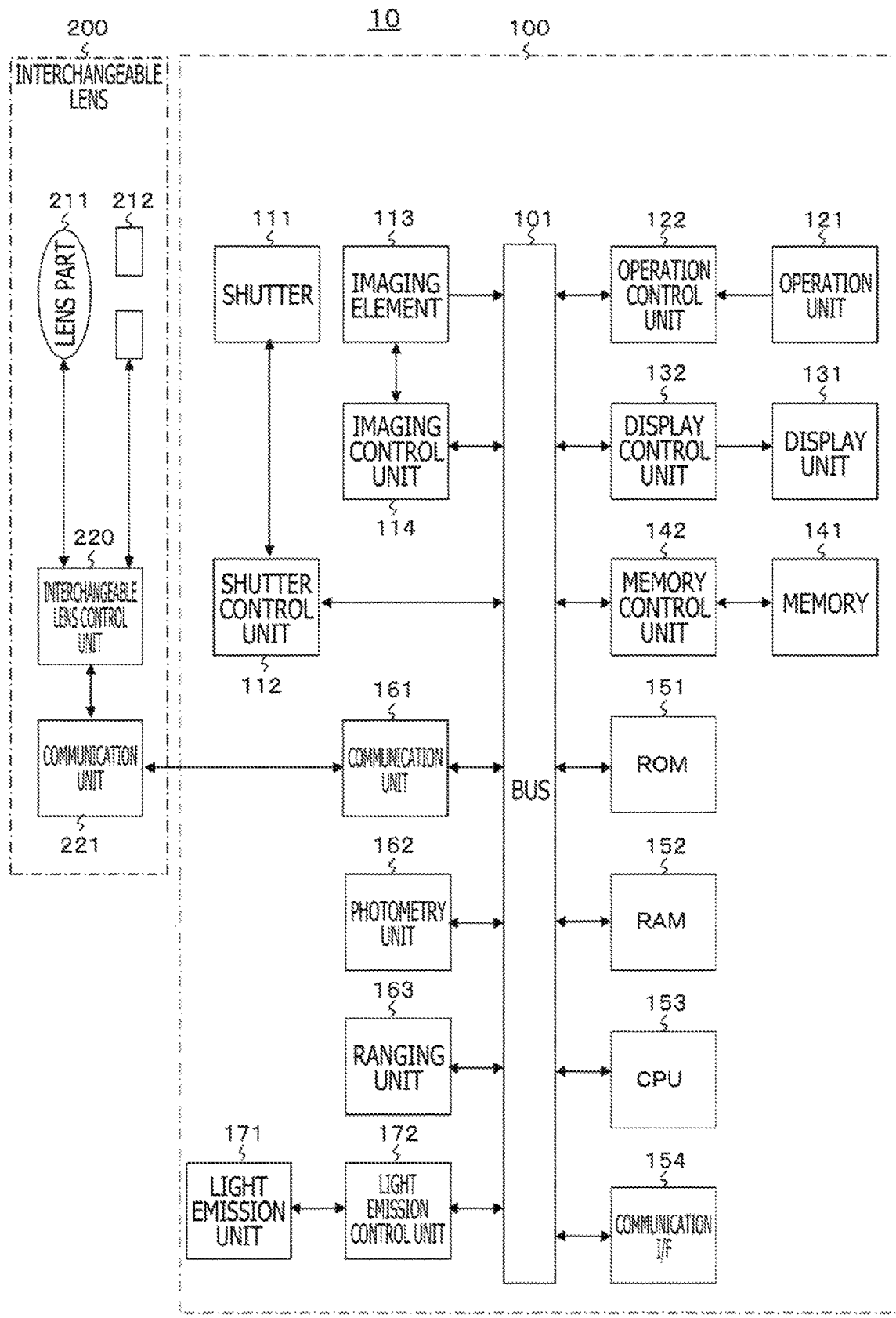
FIG. 1 is a block diagram depicting a configuration example of an imaging system as an embodiment.

FIG. 1 depicts a configuration example of an imaging system 10 as the embodiment. The imaging system 10 includes an imaging device 100 and an interchangeable lens 200. The imaging system 10 is realized by a digital still camera (e.g., a digital single-lens camera) a lens of which can be interchanged, for example.

The imaging device 100 generates image data (captured image) by capturing an image of a subject, and records the generated image data in the form of image content (still image content or video image content). Moreover, the interchangeable lens 200 can be attached to the imaging device 100 via a lens mount (not depicted).

The interchangeable lens 200 is an interchangeable lens unit which is attached to the imaging device 100 via a lens mount (not depicted). The interchangeable lens 200 includes a lens part 211, an aperture 212, an interchangeable lens control unit 220, and a communication unit 221.

The imaging device 100 includes a bus 101, a shutter 111, a shutter control unit 112, an imaging element 113, an imaging control unit 114, an operation unit 121, an operation control unit 122, a display unit 131, and a display control unit 132. Moreover, the imaging device 100 includes a memory 141, a memory control unit 142, a ROM (read only memory) 151, and a RAM (random access memory) 152.

Further, the imaging device 100 includes a CPU (central processing unit) 153 and a communication interface 154. In addition, the imaging device 100 includes a communication unit 161, a photometry unit 162, a ranging unit 163, a light emission unit 171, and a light emission control unit 172. Note that the bus 101 includes a system bus. The components constituting the imaging device 100 are connected so as to be able to communicate with one another via the bus 101.

The lens part 211 is a lens group for collecting incident light from a subject. Light collected by the lens group is incident on the imaging element 113. Note that a focusing lens for focusing and a zoom lens for enlarging the subject, etc. constitute the lens part 211. Also, the lenses constituting the lens part 211 are controlled by the interchangeable lens control unit 220 so that the zoom function and the focus function, etc., are implemented.

The communication unit 221 communicates with the communication unit 161 of the imaging device 100. The communication unit 221 receives request information from the imaging device 100 side, and transmits the request information to the interchangeable lens control unit 220. The interchangeable lens control unit 220 controls the lens part 211 and the aperture 212 in accordance with a driving request included in the request information. In addition, state information which is indicative of the positions of the lenses of the lens part 211 and of the state of the aperture 212, and which is transmitted from the communication unit 221 and the interchangeable lens control unit 220, is transmitted to the imaging device 100 side.

The aperture 212 adjusts the light quantity of incident light passing through the lens part 211. The light adjusted by the aperture 212 is incident on the imaging element 113. Also, the aperture 212 is controlled by the interchangeable lens control unit 220.

On the basis of control performed by the shutter control unit 112, the shutter 111 physically shuts off light being incident on the imaging element 113. That is, the shutter 111 adjusts the light quantity by allowing light being incident on the imaging element 113 to pass therethrough or by shutting off the light. Note that the example in which a shutter which physically shuts off light being incident on the imaging element 113, is described, but an electronic shutter capable of implementing a function equivalent to that of the above shutter may be used. The shutter control unit 112 controls the shutter 111 on the basis of control performed by the CPU 153.

On the basis of control performed by the imaging control unit 114, the imaging element 113 converts a subject optical image (subject image), which is formed on a light receiving surface with light incident thereon via the lens part 211 and the aperture 212, to electrical signals on a pixel basis, and outputs image signals (image data) for one screen. The image signals outputted from the imaging element 113 are subjected to various processes via the bus 101.

Also, various computation processes are performed with use of the image signals outputted from the imaging element 113. As the computation processes, an AF (auto focus) computation process, an AE (automatic exposure) computation process, and an AWB (auto white balance) computation process are performed, for example.

Note that, as long as the entire or a part of the image data accumulated in the imaging element can be read on the basis of control performed by the imaging control unit 114, various forms can be used as the accumulation form or the reading form in the imaging element. In addition, for example, a CCD (charge coupled device) sensor, a CMOS (complementary metal oxide semiconductor) sensor, or the like can be used as the imaging element 113.

On the basis of control performed by the CPU 153, the imaging control unit 114 controls an imaging process and an outputting process which are performed by the imaging element 113. Specifically, the imaging control unit 114 generates a timing signal for performing imaging control (e.g., a drive timing signal which is required when the imaging element 113 accumulates image signals for one screen and reads the image signals), and supplies the generated timing signal to the imaging element 113. When various types of timing signals are supplied to the imaging element 113, the timing signals are used as timing signals for the imaging process and the image signal outputting process at the imaging element 113.

The operation unit 121 includes an operation member such as a button on which various operations are performed, and receives an operation input from a user. On the basis of control performed by the CPU 153, the operation control unit 122 performs control related to the operation input received through the operation unit 121.

The details of the operation input received through the operation unit 121 are transmitted to the CPU 153 via the operation control unit 122. The operation unit 121 includes an interface for reflecting a user request in the imaging device 100. Note that, besides the operation member such as a button disposed on an outer surface of the imaging device 100, a touch panel may be provided on the display unit 131 such that an operation input from a user is received on the touch panel.

The display unit 131 displays images corresponding to various image data supplied from the display control unit 132. On the basis of control performed by the CPU 153, the display control unit 132 causes the display unit 131 to display the various image data. In addition, the display unit 131 provides, along with an image to be displayed, information associated with the image. The display unit 131 sequentially displays the image data (captured images) having been subjected to various image processes after being outputted from the imaging element 113, for example.

Moreover, the display unit 131 displays an image corresponding to an image file stored in the memory 141, for example. Note that, for example, a display panel such as an organic EL (electro luminescence) panel or an LCD (liquid crystal display) can be used as the display unit 131. A touch panel on which a user can input an operation by touching a display surface of the touch panel with a finger or bringing a finger close to the display surface, may be used, for example.

The memory 141 includes a nonvolatile storage for recording image data and the like on the basis of control performed by the memory control unit 142. On the basis of control performed by a CPU 170, the memory control unit 142 performs memory control such as data reading from the memory 141 or data writing into the memory 141.

The image data having been subjected to the various image processes after being outputted from the imaging element 113 is recorded, in the memory 141, as an image file (a still image file or a video image file). Note that the memory 141 may be configured to be attachable to/detachable from the imaging device 100, or to be fixed to or installed in the imaging device 100. Further, another storage medium such as a semiconductor memory, a magnetic disk, or an optical disk may be used as the memory 141.

The ROM 151 includes a nonvolatile memory for storing data, software, and a program to be executed by the CPU 153. The RAM 152 includes a volatile memory for holding data that is to be temporarily held when the CPU 153 operates and data that is rewritable.

The CPU 153 controls the components of the imaging device 100 on the basis of the program and software, etc. stored in the ROM 151. That is, by executing the program and software, etc., the CPU 153 comprehensively controls the constituent elements that are communicable via the bus 101.

The communication interface (communication I/F) 154 transmits or receives information by communicating with an external device such as a personal computer connected thereto via a digital interface or an external server connected thereto via a network. For example, through the communication interface 154, an image file recorded in the memory 141 can be transmitted to a server on the network, and be stored therein. Also, for example, by access to the server on the network, an update program or other information required for the CPU 153 to control the imaging device 100 can be acquired.

The photometry unit 162 receives a part of light having been incident via the lens part 211 and the aperture 212, generates a photometry signal related to the brightness of a subject side, i.e., a subject luminance, and transmits the photometry signal to the CPU 152. A photometry sensor having light reception units divided into a plurality of photometry areas, constitutes the photometry unit 162. An optical image related to a subject is divided into the plurality of photometry areas such that respective photometry values are obtained in the photometry areas.

The ranging unit 163 computes subject distance information indicating the distance from the imaging device 100 to a subject on the basis of focusing lens position information transmitted through communication from the interchangeable lens 20, and transmits the subject distance information to the CPU 151. Note that, in a case where the subject distance information is transmitted through communication from the interchangeable lens 200, computation of the subject distance information at the ranging unit 163 is not required. Note that, not only the configuration of obtaining the subject distance information by computation on the basis of the focusing lens position information, but also a configuration of obtaining the subject distance information by using ultrasonic waves, a laser, or the like, may be adopted for the ranging unit 163.

The light emission unit 171 is attached to the front surface portion or upper portion of a casing, for example, and is provided so as to apply stroboscopic light to a subject to be imaged. That is, the light emission unit 171 is provided so as to apply light in the lens optical axis direction from the lens toward the front side. The light emission unit 171 is a discharge appliance such as a xenon lamp, and can apply a flash of intense light to the subject by emitting intense light only for a moment.

On the basis of control performed by the CPU 153, the light emission control unit 172 controls a light emission quantity and a light emission timing of the light emission unit 171. In this embodiment, pre-light emission (preliminary light emission) is performed prior to main light emission in which an image of a subject is captured, and a light emission quantity for main light emission is appropriately adjusted on the basis of a result of the pre-light emission.

Figure 2:
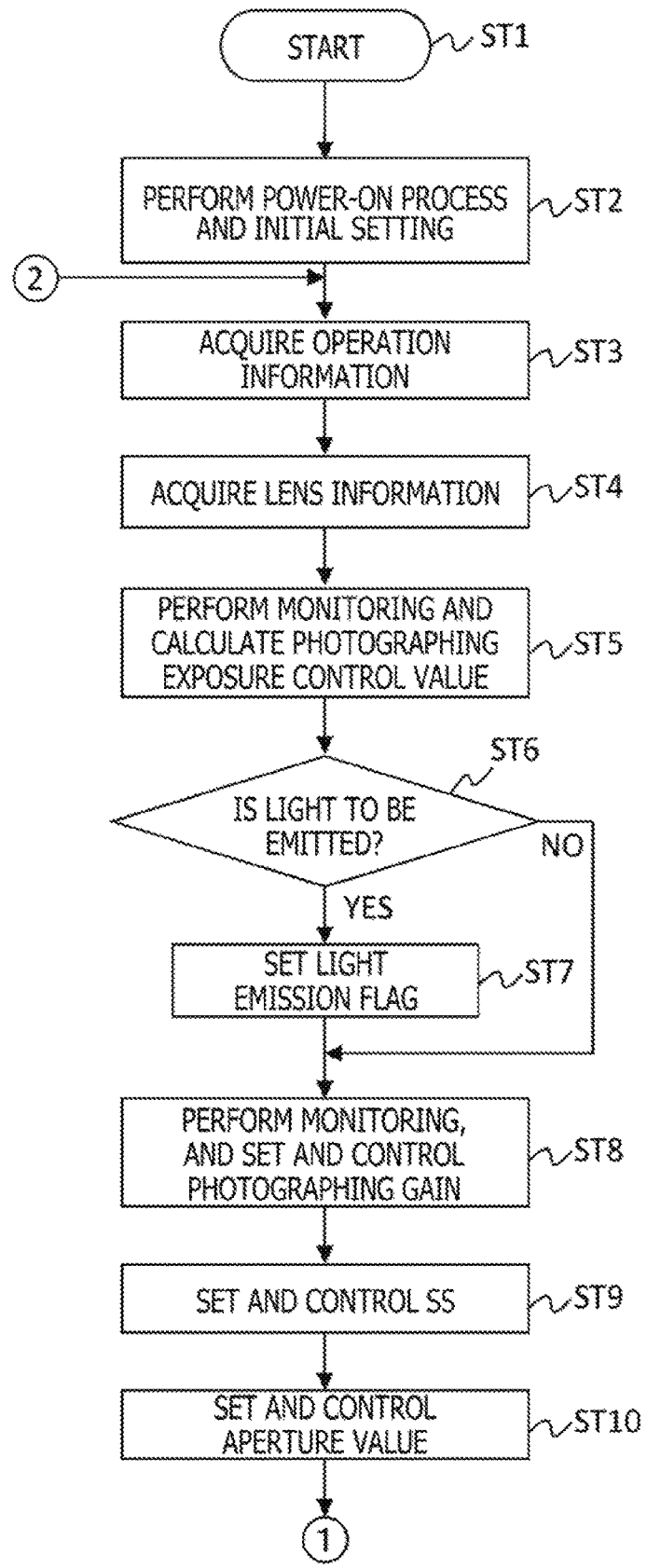
FIG. 2 is a flowchart (1/2) depicting one example of a control process during photographing.
Figure 3:
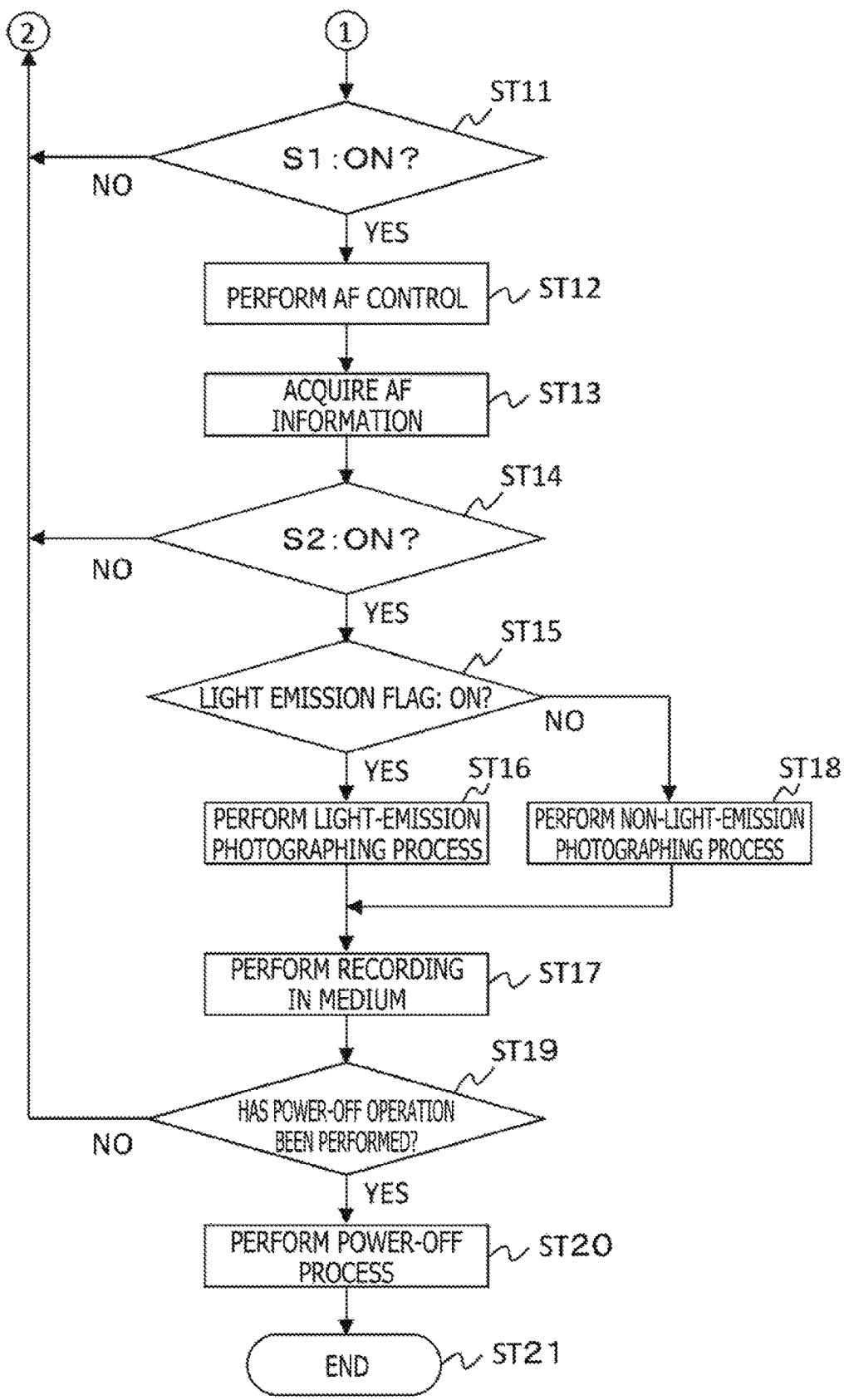
FIG. 3 is a flowchart (2/2) depicting the one example of the control process during photographing.

Flowcharts in FIGS. 2 and 3 depict one example of the control process at the CPU 153 during photographing. First, the CPU 153 starts the control process upon power-on at step ST1. Next, the CPU 153 performs a power-on process and initial setting at step ST2.

Next, at step ST3, the CPU 153 acquires operation information. In this case, the CPU 153 acquires operation information such as an exposure mode, an exposure correction value, a preview, and AF/MF switching. Next, at step ST4, the CPU 153 acquires lens information such as an aperture and a focal distance.

Next, at step ST5, the CPU 153 performs monitoring, and computes a photographing exposure control value. Next, at step ST6, the CPU 153 determines whether or not light is to be emitted. For example, when no light emission is set, light is determined not to be emitted. When automatic light emission is set and the subject luminance appears to be sufficient from the photometry signal, light is determined not to be emitted.

When light is determined to be emitted, the CPU 153 sets a light emission flag at step ST7, and thereafter, proceeds to a process at step ST8. On the other hand, when light is determined not to be emitted, the CPU 153 immediately proceeds to the process at step ST8, without setting a light emission flag.

At step ST8, the CPU 153 performs monitoring, and sets and controls a photographing gain. Next, at step ST9, the CPU 153 sets and controls a shutter speed (SS). Further, at step ST10, the CPU 153 sets and controls an aperture value.

Next, at step ST11, the CPU 153 determines whether or not an S1 ON state is established, that is, whether the shutter button is in a half-depressed state. When the S1 ON state is not established, the CPU 153 returns to the process at step ST3. On the other hand, when the S1 ON state is established, the CPU 153 performs autofocus control at step ST12.

Next, at step ST13, the CPU 153 acquires autofocus information. The autofocus information includes information regarding focusing/non-focusing and the subject distance, and information indicating the error range of the subject distance, etc.

Next, at step ST14, the CPU 153 determines whether or not an S2 ON state is established, that is, whether the shutter button is in a deep-depressed state. When the S2 ON state is not established, the CPU 153 returns to the process at step ST3. On the other hand, when the S2 ON state is established, the CPU 153 proceeds to a process at step ST15.

At step ST15, the CPU 153 determines whether or not a light emission flag is set. When a light emission flag is set, the CPU 153 performs a light-emission photographing process at step ST16, and thereafter, records the image data in a medium at step ST17. On the other hand, when a light emission flag is not set, the CPU 153 performs a non-light-emission photographing process at step ST18, and thereafter, records the image data in the medium at step ST17. Note that, in the embodiment, the medium includes the memory 141 (see FIG. 1).

Next, at step ST19, the CPU 153 determines whether or not a power-off operation has been performed. When no power-off operation has been performed, the CPU 153 returns to the process at step ST3. On the other hand, when a power-off operation has been performed, the CPU 153 performs a power-off process at step ST20, and thereafter, ends the control process at step ST21.

Figure 4:
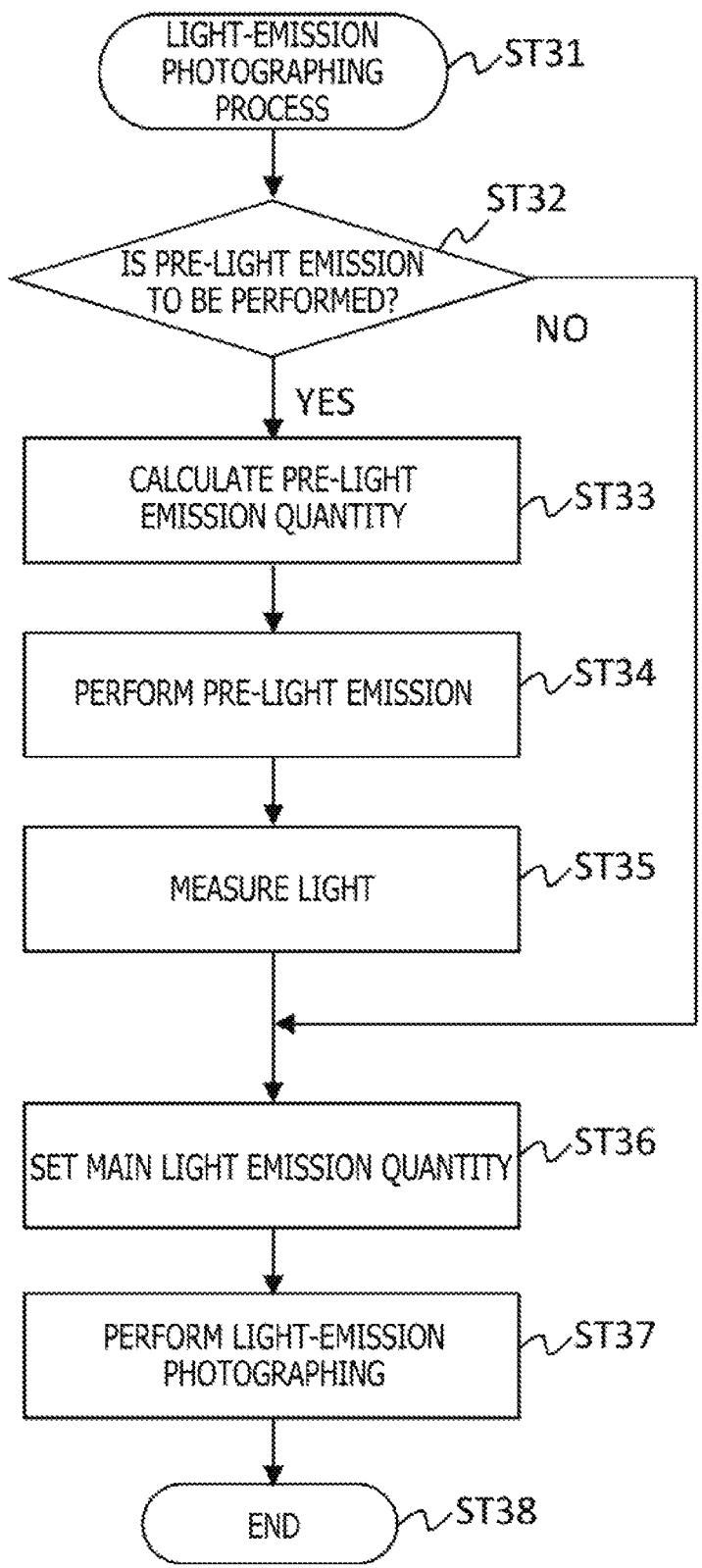
FIG. 4 is a flowchart depicting one example of a control process of light-emission photographing.

A flowchart in FIG. 4 depicts one example of a control process of light-emission photographing at the CPU 153. First, at step ST31, the CPU 153 starts the control process. Then, at step ST32, the CPU 153 determines whether or not to perform pre-light emission. For example, in a case where TTL automatic exposure control is performed, the CPU 153 determines to perform pre-light emission.

To perform pre-light emission, the CPU 153 calculates a pre-light emission quantity at step ST33. In this case, the pre-light emission quantity is computed on the basis of information regarding the ISO sensitivity, the shutter speed, the aperture, the subject distance, and the external light luminance, etc. Thereafter, the CPU 153 performs pre-light emission at step ST34, and further, performs photometry of reflection light from the subject during the pre-light emission at step ST35. On the other hand, when pre-light emission is not performed, the process immediately proceeds to step ST36.

At step ST36, the CPU 153 sets a main light emission quantity. In this case, when pre-light emission has been performed, the main light emission quantity is set on the basis of the condition of the pre-light emission and the photometry result of the pre-light emission. On the other hand, when pre-light emission has not been performed, the main light emission quantity is set to a light emission quantity that is preliminarily decided by a photographing person.

Next, at step ST37, the CPU 153 carries out photographing while performing light emission at the main light emission quantity set in this way. Thereafter, the CPU 153 ends the control process at step ST38.

Figure 5:
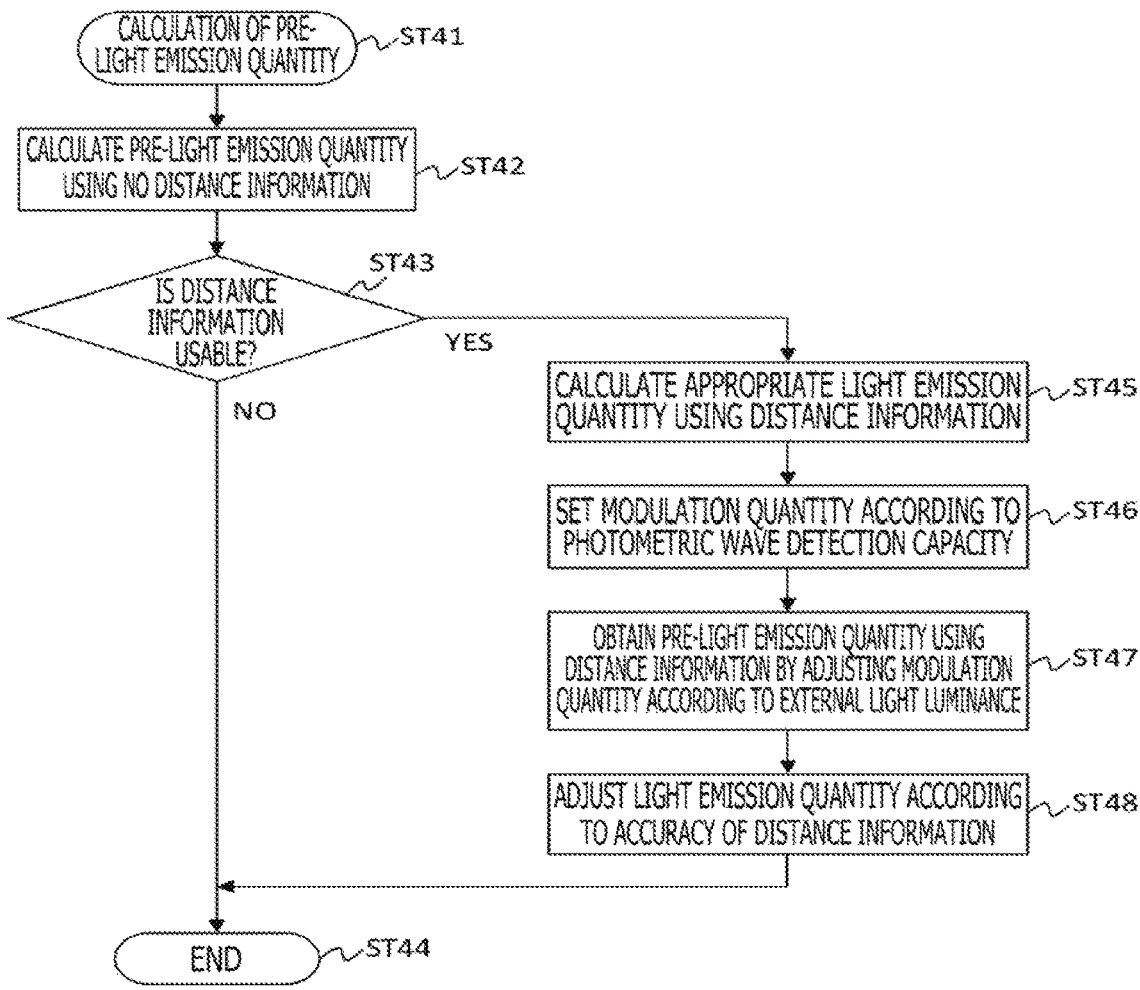
FIG. 5 is a flowchart depicting one example of a control process of calculation of a pre-light emission quantity.

A flowchart in FIG. 5 depicts one example of a control process of calculation of a pre-light emission quantity at the CPU 153. First, at step ST41, the CPU 153 starts the control process. Thereafter, at step ST42, the CPU 153 calculates a pre-light emission quantity using no distance information. In this case, the CPU 153 calculates a pre-light emission quantity according to an aperture. For example, for F2.8, pre-light emission Gno.4 is obtained by calculation.

Next, at step ST43, the CPU 153 determines whether or not distance information is usable. When the distance information is not usable, the CPU 153 sets, as a final pre-light emission quantity, the pre-light emission quantity using no distance information calculated at step ST42, and ends the control process at step ST44.

When the distance information is usable at step ST43, the CPU 153 calculates an appropriate light emission quantity using distance information, at step ST45. The CPU 153 calculates the appropriate light emission quantity from the ISO sensitivity, the distance information, and the aperture information, by using a strobe appropriate guide number calculation expression indicated by expression (1). For example, to photograph a subject at a distance of 2.0 m with the ISO sensitivity set to 100 and the aperture set to F2.8, the strobe appropriate guide number Gno) is 5.6.

[Math. 1]

$$Gno = \frac{distance \times aperture}{\sqrt{\frac{ISO\ sensitivity}{100}}} \quad (1)$$

Next, at step ST46, the CPU 153 sets a modulation quantity according to a photometric wave detection capacity. Photographing is not performed during pre-light emission. In general, recent imaging elements have photometric wave detection capacities sufficient for calculation of main light emission of strobe light, even when a light emission quantity is reduced by a few stages. For this reason, the pre-light emission quantity can be set to a light emission quantity obtained by subtracting a predetermined quantity from the appropriate light emission quantity calculated in the aforementioned way, within a range for enabling appropriate photometry. The quantity of subtraction is the aforementioned modulation quantity. As a result of such subtraction from a pre-light emission quantity, an effect of reducing unnecessary light emission energy, thereby improving the battery driving time of the entire imaging system, can be provided. In addition, as a result of reduction of unnecessary light emission energy, a strobe charge time can be shortened, whereby consecutive strobe light flashing performance is improved.

For example, the modulation quantity is determined so as to obtain a minimum pre-light emission quantity within a range that, when a prescribed subject (e.g., a 18%-gray object, a low reflection object, a high reflection object, or a person) is irradiated with a strobe light at a defined distance, can ensure the linearity of a signal level obtained by photometry of the reflection light, without affecting computation for main light emission.

For example, a method can be used in which, for a black subject at a distance of 20 m, a Gno obtained by the above strobe appropriate guide number calculation expression indicated by expression (1) is compared with a result obtained by a gradual decrease. In this case, in a case where a photometry signal level that does not affect computation for main light emission is obtained from the reflection light although the light emission quantity is decreased by two stages, the decrease quantity for obtaining the two-stage decreased light emission quantity is adopted as the modulation quantity.

Next, at step ST47, the CPU 153 adjusts the modulation quantity according to an external light luminance, subtracts the adjusted modulation quantity from the appropriate light emission quantity calculated at step ST45, and sets the resultant quantity as the pre-light emission quantity using distance information.

An appropriate value for a pre-light emission quantity is actually influenced by an external light luminance. In general, in photometry during pre-light emission for setting strobe main light emission, information is obtained from the difference between a non-light emission time and a pre-light emission time. With a low external light luminance, a light emission component of pre-light emission can be sufficiently detected. With an extremely high external light luminance, pre-light emission is buried in the external light luminance when the pre-light emission quantity is small. Thus, the S/N ratio at the time of photometry is deteriorated so that the possibility that main light emission setting is not appropriate is increased. Accordingly, in the embodiment, the modulation quantity is adjusted according to an external light luminance, as described above.

In this case, when the photometry component of an external light luminance is greater than the photometry component of pre-light emission performed at the light emission quantity obtained by subtracting the modulation quantity set at step ST46 from the appropriate light emission quantity calculated at step ST45, the modulation quantity set at step ST46 is adjusted to be small.

An APEX expression for calculating an appropriate luminance by from a control value is indicated by expression (2). In expression (2), tv represents a shutter speed, av represents an aperture, and sv represents an ISO sensitivity.

$$bv=tv+av-sv \quad (2)$$

An APEX expression for calculating an appropriate light emission quantity iv from a control value is indicated by expression (3). In expression (3), dv represent a distance, av represents an aperture, and sv represents an ISO sensitivity.

$$iv=dv+av-sv \quad (3)$$

Expression (4) is obtained from expressions (2) and (3). In expression (4), the luminance by serves as a function of the light emission quantity iv.

$$bv=iv-dv+tv \quad (4)$$

In expression (4), by represents an external light luminance the photometry component of which matches the photometry component of pre-light emission performed at the light emission quantity iv. Here, by is referred to as a determination luminance. When the external light luminance is higher than the determination luminance, pre-light emission is buried in the external light luminance so that the S/N ratio at the time of photometry is deteriorated.

A light emission quantity obtained by subtracting the modulation quantity set at step ST46 from the appropriate light emission quantity calculated at step ST45 is applied as the light emission quantity iv in expression (4). Accordingly, the determination luminance corresponding to the light emission quantity can be obtained. In the embodiment, when the external light luminance is higher than the determination luminance, the modulation quantity set at step ST46 is adjusted to be small.

Figure 6:
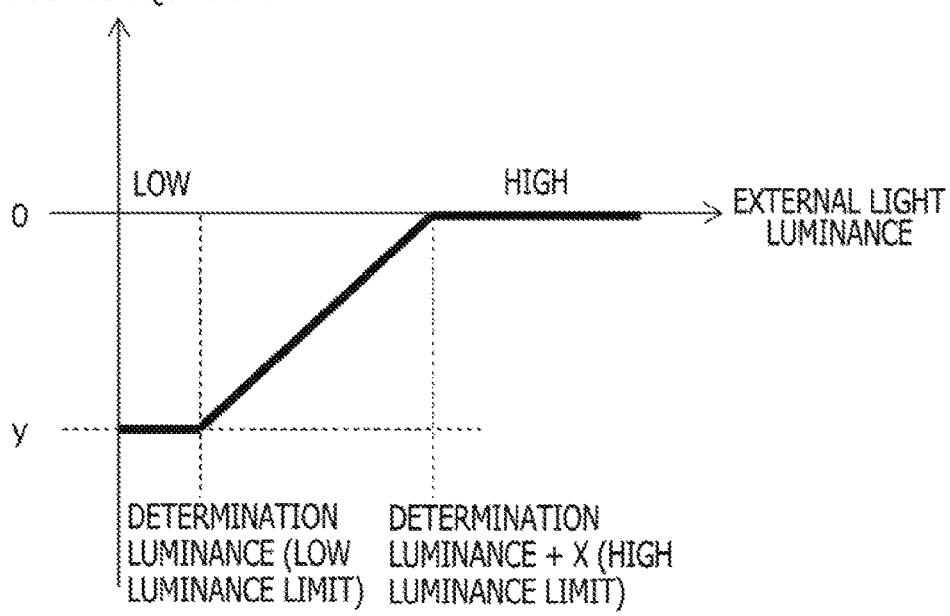
FIG. 6 is a diagram depicting one example of adjustment of a modulation quantity according to an external light luminance.

FIG. 6 depicts one example of adjustment of the modulation quantity according to an external light luminance. In FIG. 6, "y" represents the modulation quantity obtained at step ST46. In the example depicted in FIG. 6, the modulation quantity is kept at y when the external light luminance is equal to or lower than a determination luminance, the modulation quantity linearly changes so as to gradually become smaller with an increase of the external light luminance when the external light luminance is higher than the determination luminance, and the modulation quantity is 0 when the external light luminance is higher than the determination luminance by x.

The reason why the modulation quantity is adjusted according to the external light luminance in the aforementioned way, is that a light emission quantity that can withstand an external light luminance (that can maintain the S/N ratio of pre-light emission) is obtained. When an element which is used for photometry has a single characteristic, the modulation quantity is decreased by an amount equal to the increase amount of the external light luminance, that is, is linearly changed at an inclination of 1. Accordingly, while the S/N ratio is maintained to be fixed, the above purpose is accomplished.

However, for example, in a case where elements having different photometry characteristics are embedded in a single element, or in a case where an element is used in combination with a separate element, the inclination thereof is not 1. For example, a photometry element is changed based on low luminance/high luminance, an inflection point appears at the luminance change. In this case, in a case where low luminance and high luminance photometry elements have different characteristics, the ratio (inclination of the graph) of the increase/decrease amount of the modulation quantity with respect to the increase amount of the external light luminance is changed at the inflection point.

Figure 7A:
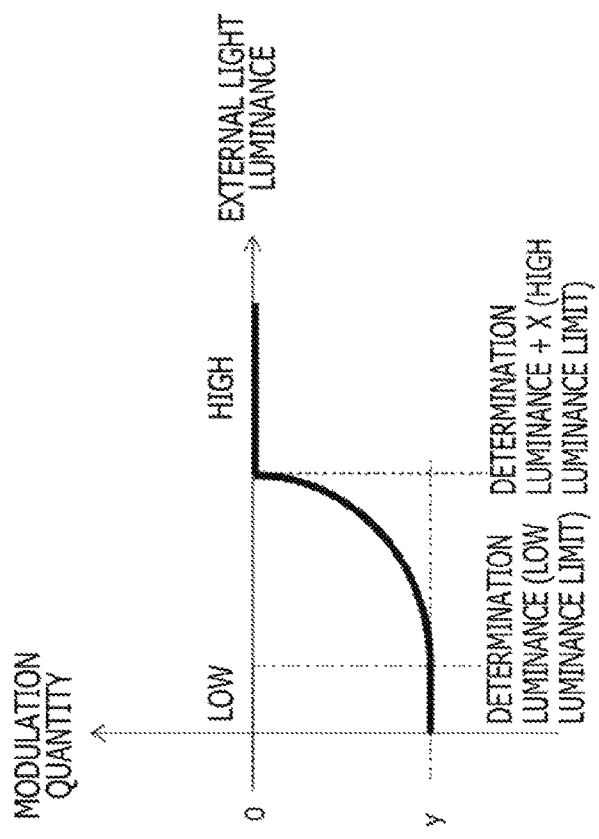
FIGS. 7A and 7B are diagrams depicting another example of adjustment of a modulation quantity according to an external light luminance.
Figure 7B:
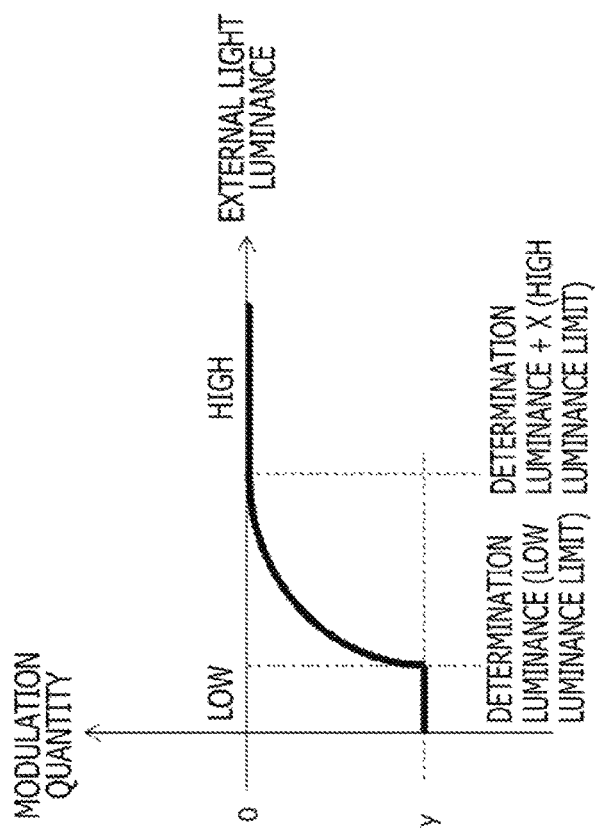

Besides, in a case where two photometry elements have the same photometry characteristics but constantly perform photometry on both a far side and a near side and mixes the results to be used as an external light luminance, the modulation quantity may be not linearly decreased with an increase of the external light luminance. FIGS. 7A and 7B each depict one example in which the modulation quantity is not linearly decreased with respect to an increase of the external light luminance. Note that, in another example (not depicted), the modulation quantity may be stepwisely changed with respect to an increase of the external light luminance.

The horizontal axis in FIG. 6 represents the external light luminance. In a case where light control is desired to be performed with great significance given to the brightness of a subject, the luminance of the subject (e.g., the face part of a person) may be used as a variation of the horizontal axis. Alternatively, the mixture of the luminance of a person and the luminance of a background, etc., may be used as a luminance for the horizontal axis.

Referring back to FIG. 5, next, the CPU 153 adjusts the light emission quantity of pre-light emission according to the accuracy of distance information, at step ST48. Since the pre-light emission quantity using the distance information obtained at step ST47 is basically obtained by calculation with use of distance information, photometry is affected by deterioration of the accuracy of the distance information.

Figure 8:
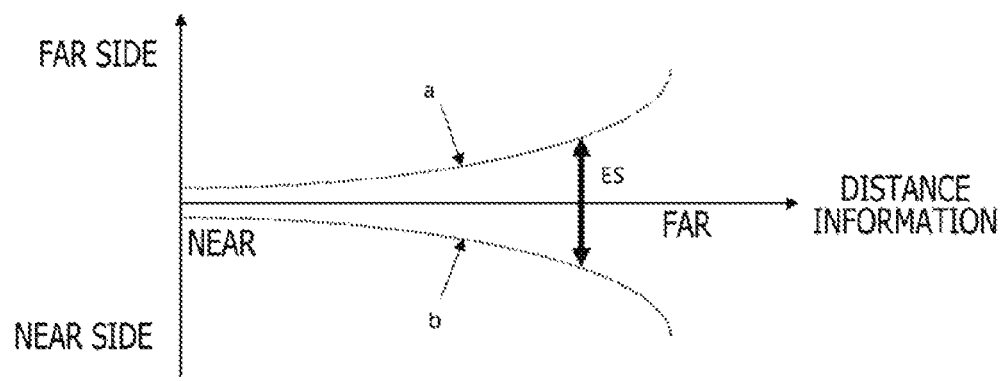
FIG. 8 is a diagram for explanation of an error range ES of distance information.

For the accuracy of the distance information, there are various factors according to the ranging system (ranging sensor). However, in general, the far-side and near-side errors are increased with an increase of the distance so that the error range ES of the distance information is widened, as depicted in FIG. 8. In FIG. 8, a curved line a represents a maximum far-side error while a curved line b represents a maximum near-side error. The sum of the maximum far-side error and the maximum near-side error is the error range ES.

In the embodiment, even in a case where the accuracy of distance information is deteriorated, the light control performance can be maintained. Thus, the pre-light emission quantity (first pre-light emission quantity) using no distance information obtained at step ST42 and the pre-light emission quantity (second pre-light emission quantity) using distance information obtained at step ST47 are mixed at a ratio corresponding to the error range of the distance information, and the resultant quantity is set as a final pre-light emission quantity.

Figure 9:
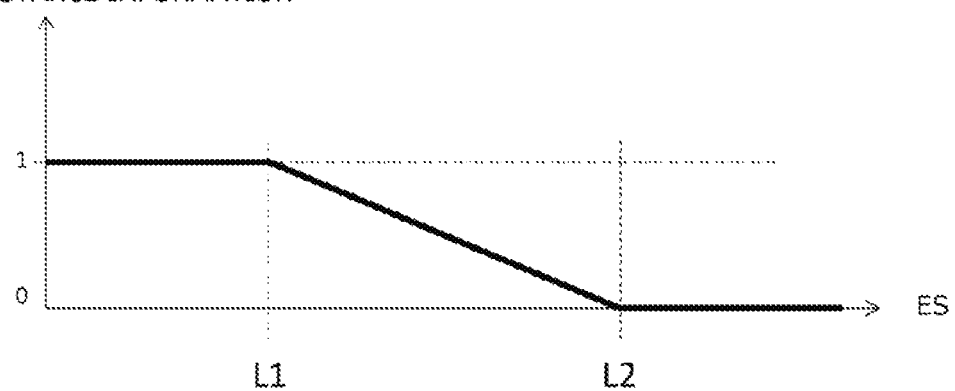
FIG. 9 is a diagram depicting one example of the ratio of a pre-light emission quantity (second pre-light emission quantity) using distance information, which is mixed with a pre-light emission quantity (first pre-light emission quantity) using no distance information.

FIG. 9 depicts the mixture ratio of the mixed second pre-light emission quantity. The ratio of the first pre-light emission quantity is obtained by subtracting the ratio of the second pre-light emission quantity from 1. In the example depicted in FIG. 9, "L1" represents a threshold indicating a limit of a good accuracy with a small error range of distance information, and "L2" represents a threshold indicating a limit of a poor accuracy with a large error range of distance information. Note that each of the thresholds can be set to an arbitrary value, and also, can be changed.

With the mixture ratio of the second pre-light emission quantity depicted in FIG. 9, a final pre-light emission quantity is calculated as follows. When the error range ES is in a range equal to or less than L1, the second pre-light emission quantity is directly set as the final pre-light emission quantity. When the error range ES is in a range equal to or greater than L2, the first pre-light emission quantity is directly set as the final pre-light emission quantity. When the error range ES is in a range greater than L1 but less than L2, the first pre-light emission quantity and the second pre-light emission quantity are mixed such that the ratio of the second light emission quantity is gradually decreased with an increase of the error range ES, and the resultant quantity is set as the final pre-light emission quantity.

Figure 10A:
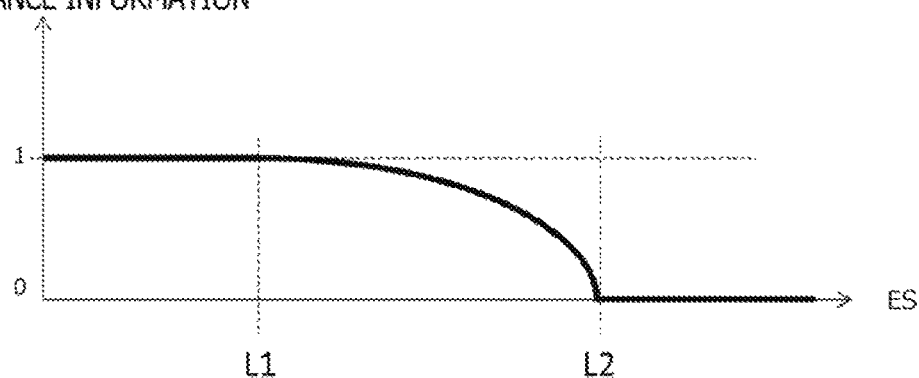
FIGS. 10A and 10B are diagrams depicting another example of the ratio of a pre-light emission quantity (second pre-light emission quantity) using distance information, which is mixed with a pre-light emission quantity (first pre-light emission quantity) using no distance information.
Figure 10B:
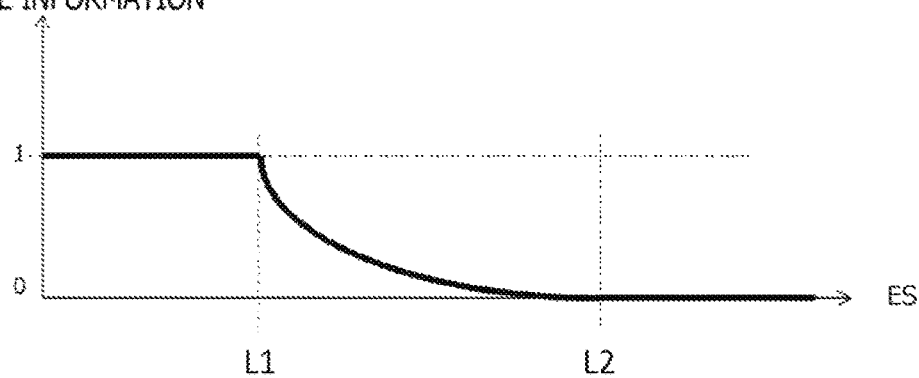

In the example in FIG. 9, the mixture ratio of the second light quantity is linearly decreased with the increase of the error range ES. However, the change does not need to be linear. FIGS. 10A and 10B each depict one example in which the mixture ratio of the second light emission quantity is not linearly decreased with an increase of the error range ES. Note that, in another example (not depicted), the mixture ratio of the second light emission quantity may be step-wisely changed.

Note that information regarding the error range of distance information is basically obtained together with the distance information from the ranging system (ranging sensor). In a case where distance information is transmitted though communication from the interchangeable lens 200 side to the imaging device 100 side, as described above, information regarding the error range is also transmitted through communication from the interchangeable lens 200 side to the imaging device 100 side, for example, and is used. In this case, together with the distance information, information regarding the maximum error on the near side error and the maximum error on the far side is transmitted from the interchangeable lens 200 side to the imaging device 100 side, for example.

Also, in a case where distance information is obtained by transmitting the distance information through communication from the interchangeable lens 200 side to the imaging device 100 side, or by transmitting focusing lens position information through communication from the interchangeable lens 200 side to the imaging device 100 side, and causing the ranging unit 163 to compute the distance information based on the focusing lens position information, error information may be acquired from the correspondence between the distance information and the error information stored, in the holding unit such as the ROM 151 or the RAM 152, in association with the interchangeable lens 200, and then, the error information may be used.

In this case, the correspondences between error information and distance information corresponding to a plurality of the interchangeable lenses 200 may be preliminarily stored in the holding unit. Alternatively, when the interchangeable lens 200 is attached to the imaging device 100, the correspondence between error information and distance information corresponding to the interchangeable lens 200 may be downloaded by the communication interface 154 from an external server, based on the lens information regarding the interchangeable lens 200, and be stored in the holding unit.

Alternatively, in this case, the correspondence between error information and distance information corresponding to the interchangeable lens 200 inputted by a user through the operation unit 121 may be preliminarily stored in the holding unit. In this case, since inputting error information corresponding to all the distances is difficult, the user may input only error information corresponding to a few distances so that the CPU 153 performs approximation calculation using the error information, thereby interpolates error information corresponding to the other distances.

Note that examples of an error of distance information include errors due to a mechanical assembling accuracy and an AF error (the size of an allowable circle of confusion), etc. An explanation of an AF error is given. When a point on an object surface is photographed, the point is formed as a point on an image surface, and is formed as a circle on an area forwardly or rearwardly deviated from the image surface. This circle is called a circle of confusion. The maximum circle that is considered to be in focus is called an allowable circle of confusion. That is, even in a case where focus is considered to be achieved by autofocusing, an error having a size equal to an allowable circle of confusion is generated.

Examples of an error of distance information include an error caused by expansion of a lens member due to a change in environmental temperature, in addition to the aforementioned errors due to a mechanical assembling accuracy and an AF error, etc. Errors due to a mechanical assembling accuracy and an AF error, etc. are taken into consideration in the aforementioned error information corresponding to the distance information, but an error due to a change in environmental temperature is not included in the error information. Therefore, the aforementioned error information corresponding to the distance information may be corrected based on environmental temperature, and then, be used. Accordingly, a pre-light emission quantity using distance information can be more appropriately calculated.

Referring back to FIG. 5, the CPU 153 ends the control process at step ST44 after performing the process at step ST48.

As described above, at the imaging device 100 in the imaging system 10 depicted in FIG. 1, the first pre-light emission quantity (pre-light emission quantity calculated without no use of distance information) and the second pre-light emission quantity (pre-light emission quantity calculated with use of distance information) are mixed at the ratio corresponding to the accuracy of distance information, and the resultant quantity is set as the final pre-light emission quantity. Accordingly, the influence of a poor accuracy of distance information regarding pre-light emission can be lessened, whereby the accuracy of light control for main light emission can be enhanced.

In addition, at the imaging device 100 in the imaging system 10 depicted in FIG. 1, the predetermined quantity (modulation quantity) by which the appropriate light emission quantity is decreased to obtain the second pre-light emission quantity can be adjusted according to an external light luminance. Therefore, deterioration of the S/N ratio of the photometry component of pre-light emission in a case where the external light luminance is high, can be prevented, whereby the accuracy of light control for main light emission can be enhanced.

2. Modification

Note that the aforementioned embodiment has presented the example depicted by the flowchart in FIG. 5, as one example of the control process of calculation of a pre-light emission quantity at the CPU 153. However, examples depicted by the flowcharts in FIGS. 11 to 14 may be adopted as other examples of the control process of calculation of a pre-light emission quantity at a CPU 101. Throughout the flowcharts depicted in FIGS. 11 to 13, steps are denoted by the same reference numbers as those of the corresponding steps in the flowchart in FIG. 5.

Figure 11:
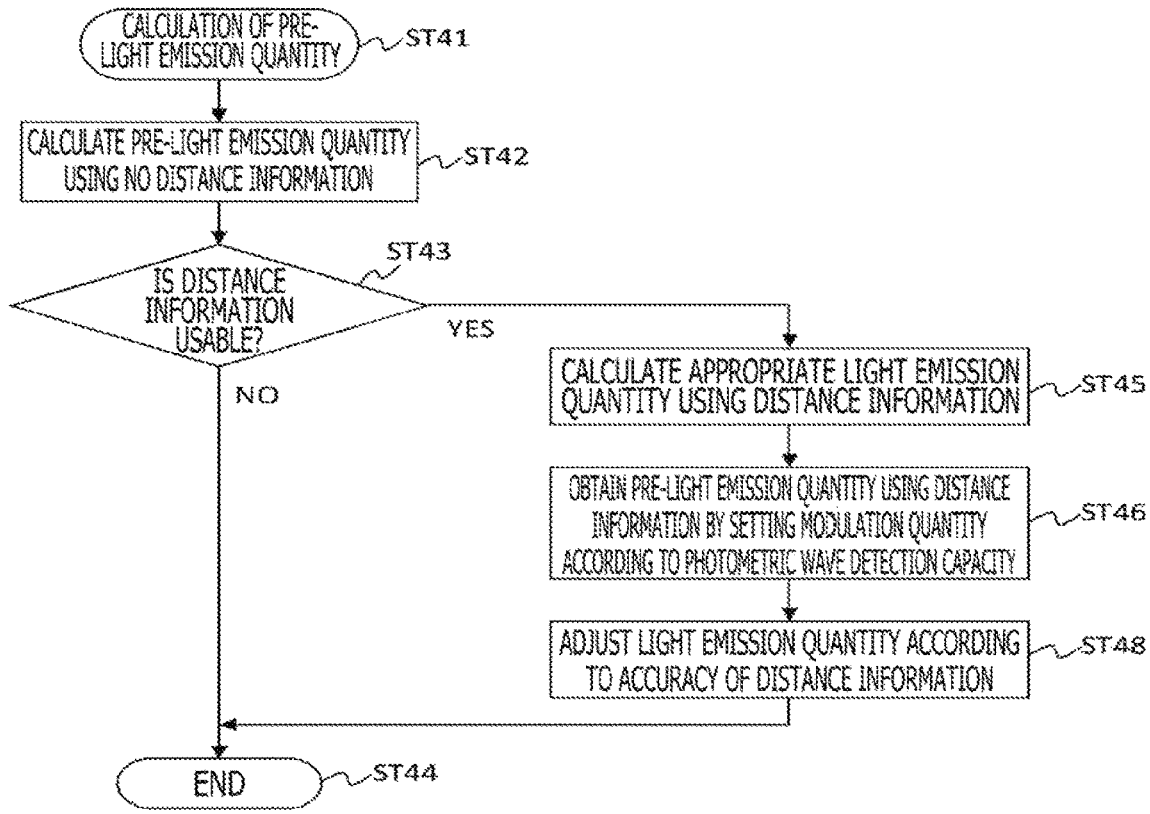
FIG. 11 is a flowchart depicting another example of the control process of calculation of a pre-light emission quantity.
Figure 12:
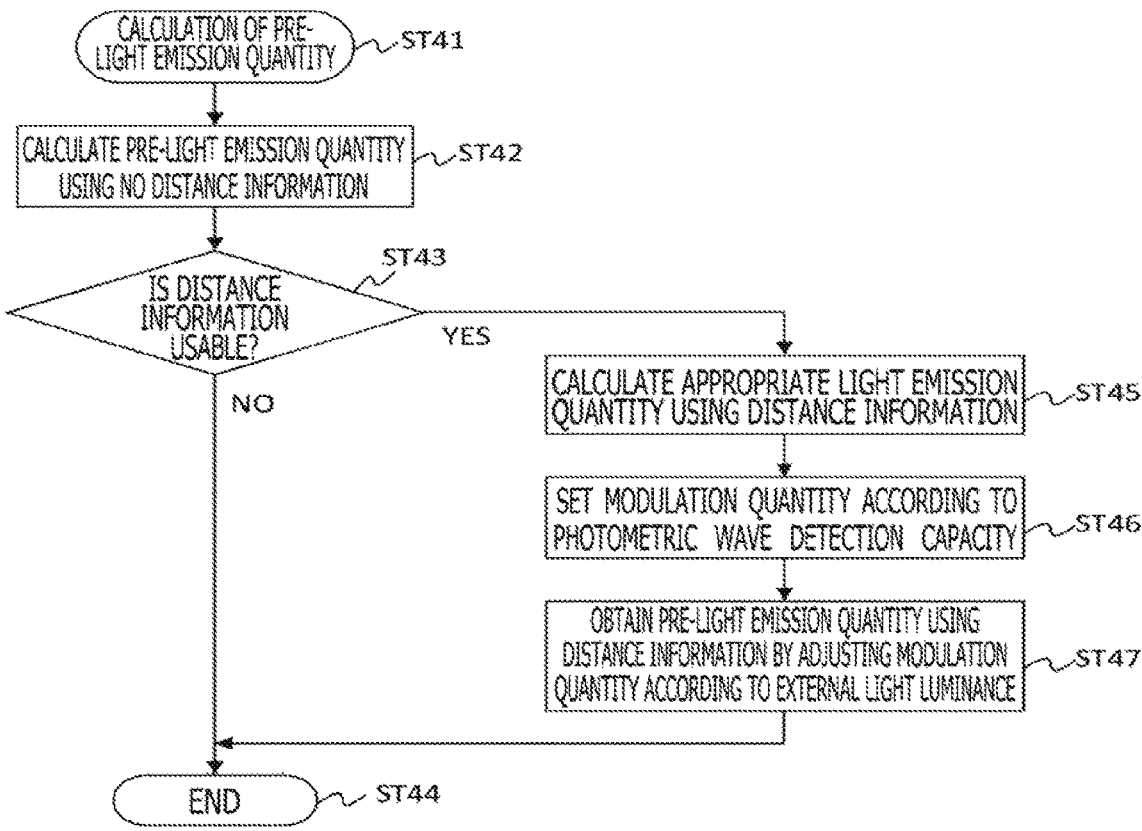
FIG. 12 is a flowchart depicting still another example of the control process of calculation of a pre-light emission quantity.

The example depicted by the flowchart in FIG. 11 is obtained by eliminating the process at step ST47 from the example depicted by the flowchart in FIG. 5. In this case, at step ST46, the set modulation quantity is subtracted from the appropriate light emission quantity calculated at step ST45 so that the pre-light emission quantity using distance information is obtained. Further, the example depicted by the flowchart in FIG. 12 is obtained by eliminating the process at step ST48 from the example depicted by the flowchart in FIG. 5.

Figure 13:
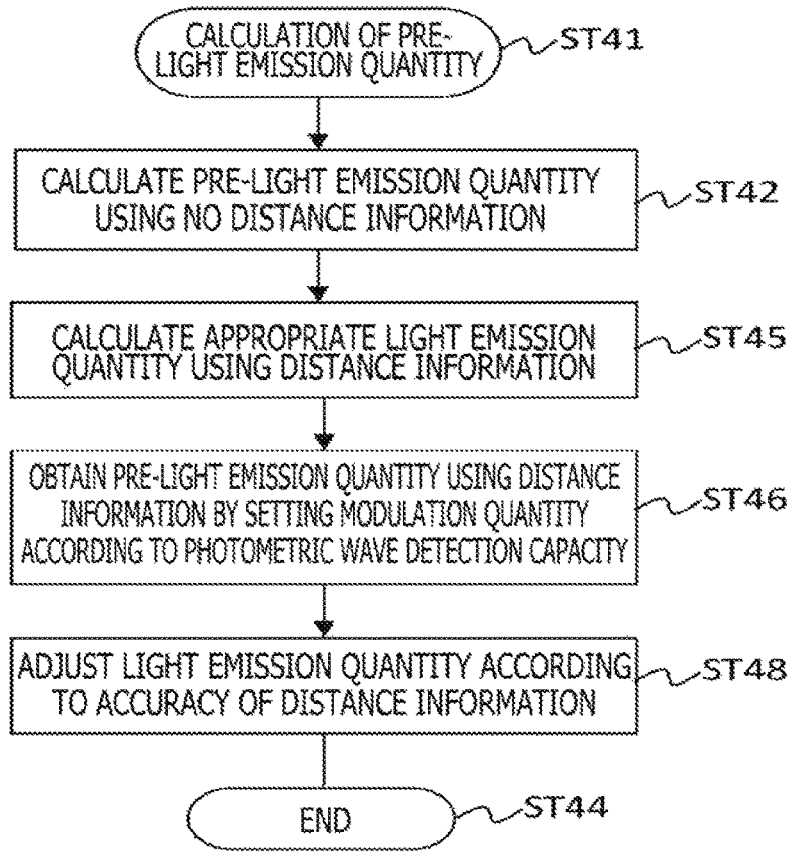
FIG. 13 is a flowchart depicting yet another example of the control process of calculation of a pre-light emission quantity.
Figure 14:
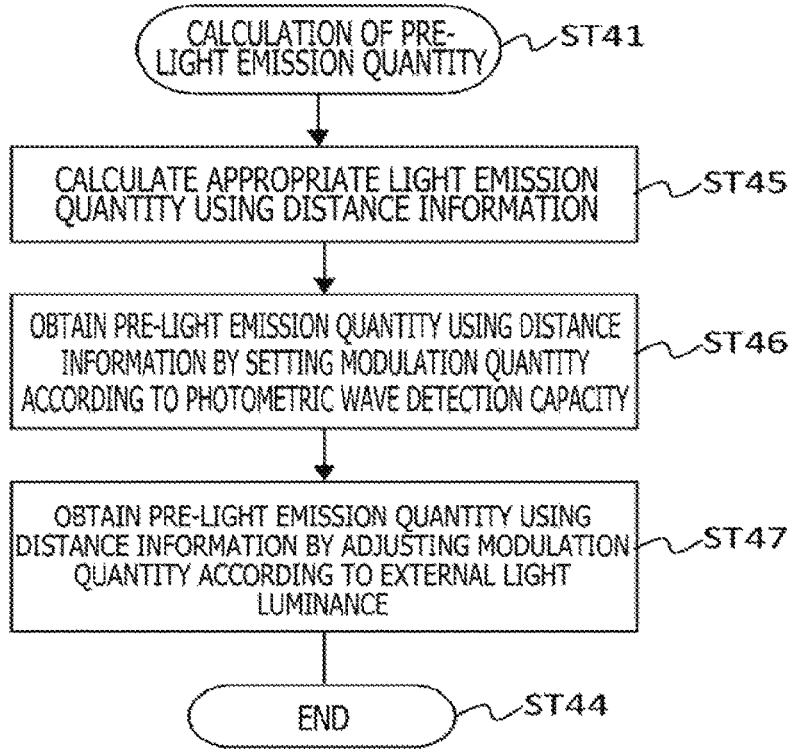
FIG. 14 is a flowchart depicting yet another example of the control process of calculation of a pre-light emission quantity.

Moreover, the example depicted by the flowchart in FIG. 13 is obtained by eliminating the processes at step ST43 and at step 47 from the example depicted by the flowchart in FIG. 5. Further, the example depicted by the flowchart in FIG. 14 is obtained by eliminating the processes at step ST42, step ST43, and step ST48 from the example depicted by the flowchart in FIG. 5.

The preferred embodiment of the present disclosure has been described in detail with reference to the attached drawings. However, the technical scope of the present disclosure is not limited to the above embodiment. It is clear that a person having common knowledge in the technical field of the present disclosure can conceive of making various changes and modifications within the scope of the technical concept set forth in the claims. These changes and modifications are naturally considered to belong to the technical scope of the present disclosure.

In addition, the process steps having been described in the aforementioned embodiment may be regarded as a method including a series of the steps, or may be regarded as a program for causing a computer to execute a series of the steps or as a recording medium having the program stored therein. As such a recording medium, a CD (compact disc), an MD (mini disc), a DVD (digital versatile disk), a memory card, a Blu-ray disc (registered trademark), or the like, may be used, for example.

The present technique can also take the configurations as follows.

(1)
An imaging device including
a control unit that controls a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of obtaining a final pre-light emission quantity from the first pre-light emission quantity and the second pre-light emission quantity, based on a ratio according to an accuracy of the distance information used to obtain the appropriate light emission quantity.

(2)
The imaging device according to (1), in which
in the third process, the accuracy of the distance information is determined based on information indicating an error range of a distance indicated by the distance information, and, when the error range falls within a range equal to or less than a first threshold, the second pre-light emission quantity is directly used as the final pre-light emission quantity, when the error range falls within a range equal to or greater than a second threshold which is greater than the first threshold, the first pre-light emission quantity is directly used as the final pre-light emission quantity, and, when the error range falls within a range greater than the first threshold but less than the second threshold, the first pre-light emission quantity and the second pre-light emission quantity are mixed such that a ratio of the second light emission quantity is gradually decreased with an increase of the error range, and the resultant quantity is set as the final pre-light emission quantity.

(3)
The imaging device according to claim 2), in which
the control unit acquires the distance information from a lens device.

(4)
The imaging device according to (3), in which
the control unit acquires, from the lens device, the information indicating an error range of a distance indicated by the distance information.

(5)
The imaging device according to (4), in which
the control unit corrects, based on environmental temperature, the information that is acquired from the lens device and that indicates an error range of a distance indicated by the distance information, and uses the corrected information.

(6)
The imaging device according to (3), further including
a holding unit that holds information regarding an error range corresponding to distance information acquired from the lens device, in which
the control unit acquires, from the holding unit, information indicating an error range of a distance indicated by the distance information.

(7)
The imaging device according to claim 6), in which
the control unit corrects, based on environmental temperature, the information that is acquired from the holding unit and that indicates an error range of a distance indicated by the distance information, and uses the corrected information.

(8)
The imaging device according to (6), further including
a communication unit for acquiring the information regarding an error range corresponding to the lens device from an external server, so as to hold the information in the holding unit.

(9)
The imaging device according to (6) or (7), further including
a user operation unit to which the about an error range corresponding to the lens device is inputted so as to be held in the holding unit.

(10)

The imaging device according to any one of (1) to (9), in which the control unit further controls a fourth process of adjusting, according to an external light luminance, the predetermined quantity by which the appropriate light emission quantity is decreased to obtain the second pre-light emission quantity.

(11)

The imaging device according to (10), in which in the fourth process, the predetermined quantity is adjusted to be small when a photometry component of the external light luminance is greater than a photometry component of pre-light emission performed at the second pre-light emission quantity.

(12)

An imaging device control method including:

a step of obtaining a first pre-light emission quantity with no use of distance information;

a step of obtaining an appropriate light emission quantity with use of distance information and obtaining a second pre-light emission quantity by decreasing the appropriate light emission quantity by a predetermined quantity according to a photometric wave detection capacity; and a step of obtaining a final pre-light emission quantity from the first pre-light emission quantity and the second pre-light emission quantity, based on a ratio corresponding to an accuracy of the distance information used to obtain the appropriate light emission quantity.

(13)

An imaging device including a control unit that controls a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of adjusting, according to an external light luminance, the predetermined quantity by which the appropriate light emission quantity is decreased to obtain the second pre-light emission quantity.

(14)

The imaging device according to (13), in which in the third process, the predetermined quantity is adjusted to be small when a photometry component of the external light luminance is greater than a photometry component of pre-light emission performed at the second pre-light emission quantity.

(15)

An imaging device control method including:

a step of obtaining a first pre-light emission quantity with no use of distance information;

a step of obtaining an appropriate light emission quantity with use of distance information and obtaining a second pre-light emission quantity by decreasing the appropriate light emission quantity by a predetermined quantity according to a photometric wave detection capacity; and a step of adjusting, according to an external light luminance, the predetermined quantity by which the appropriate light emission quantity is decreased to obtain the second pre-light emission quantity.

(16)

A processing device including a control unit that controls a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of obtaining a final pre-light emission quantity from the first pre-light emission quantity and the second pre-light emission quantity, based on a ratio corresponding to an accuracy of the distance information used to obtain the appropriate light emission quantity.

REFERENCE SIGNS LIST

10 . . . Imaging system
100 . . . Imaging device
101 . . . Bus
111 . . . Shutter
112 . . . Shutter control unit
113 . . . Imaging element
114 . . . Imaging control unit
121 . . . Operation unit
122 . . . Operation control unit
131 . . . Display unit
132 . . . Display control unit
141 . . . Memory
142 . . . Memory control unit
151 . . . ROM
152 . . . RAM
153 . . . CPU
161 . . . Communication unit
162 . . . Photometry unit
163 . . . Ranging unit
171 . . . Light emission unit
172 . . . Light emission control unit
200 . . . Interchangeable lens
211 . . . Lens part
212 . . . Aperture
220 . . . Interchangeable lens control unit
221 . . . Communication unit

The invention claimed is:

1. An imaging device, comprising:
a control unit configured to control a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of obtaining a final pre-light emission quantity from the first pre-light emission quantity and the second pre-light emission quantity, based on a ratio according to an accuracy of the distance information used to obtain the appropriate light emission quantity.

2. The imaging device according to claim 1, wherein
in the third process, the accuracy of the distance information is determined based on information indicating an error range of a distance indicated by the distance information, and, when the error range falls within a range equal to or less than a first threshold, the second pre-light emission quantity is directly used as the final pre-light emission quantity, when the error range falls within a range equal to or greater than a second threshold which is greater than the first threshold, the first pre-light emission quantity is directly used as the final pre-light emission quantity, and, when the error range falls within a range greater than the first threshold but less than the second threshold, the first pre-light emission quantity and the second pre-light emission quantity are mixed such that a ratio of the second light emission quantity is gradually decreased with an increase of the error range, and the resultant quantity is set as the final pre-light emission quantity.

3. The imaging device according to claim 2, wherein the control unit is further configured to acquire the distance information from a lens device.

4. The imaging device according to claim 3, wherein the control unit is further configured to acquire, from the lens device, the information indicating an error range of a distance indicated by the distance information.

5. The imaging device according to claim 4, wherein the control unit is further configured to correct, on a basis of environmental temperature, the information that is acquired from the lens device and that indicates an error range of a distance indicated by the distance information, and uses the corrected information.

6. The imaging device according to claim 3, further comprising:
a holding unit configured to hold information regarding an error range corresponding to the distance information acquired from the lens device, wherein
the control unit is further configured to acquire, from the holding unit, information indicating an error range of a distance indicated by the distance information.

7. The imaging device according to claim 6, wherein the control unit is further configured to correct, on a basis of environmental temperature, the information that is acquired from the holding unit and that indicates an error range of a distance indicated by the distance information, and uses the corrected information.

8. The imaging device according to claim 6, further comprising:
a communication unit configured to acquire the information regarding an error range corresponding to the lens device from an external server, so as to hold the information in the holding unit.

9. The imaging device according to claim 6, further comprising:
a user operation unit to which the information regarding an error range corresponding to the lens device is inputted so as to be held in the holding unit.

10. The imaging device according to claim 1, wherein the control unit is further configured to control a fourth process of adjusting, according to an external light luminance, the predetermined quantity by which the appropriate light emission quantity is decreased to obtain the second pre-light emission quantity.

11. The imaging device according to claim 10, wherein in the fourth process, the predetermined quantity is adjusted to be small when a photometry component of the external light luminance is greater than a photometry component of pre-light emission performed at the second pre-light emission quantity.

12. An imaging device control method, comprising:
obtaining a first pre-light emission quantity with no use of distance information;
obtaining an appropriate light emission quantity with use of distance information;
obtaining a second pre-light emission quantity by decreasing the appropriate light emission quantity by a predetermined quantity according to a photometric wave detection capacity; and
obtaining a final pre-light emission quantity from the first pre-light emission quantity and the second pre-light emission quantity, on a basis of a ratio corresponding to an accuracy of the distance information used to obtain the appropriate light emission quantity.

13. An imaging device, comprising:
a control unit configured to control a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of adjusting, according to an external light luminance, the predetermined quantity by which the appropriate light emission quantity is decreased to obtain the second pre-light emission quantity.

14. The imaging device according to claim 13, wherein in the third process, the predetermined quantity is adjusted to be small when a photometry component of the external light luminance is greater than a photometry component of pre-light emission performed at the second pre-light emission quantity.

15. An imaging device control method, comprising:
obtaining a first pre-light emission quantity with no use of distance information;
obtaining an appropriate light emission quantity with use of distance information;
obtaining a second pre-light emission quantity by decreasing the appropriate light emission quantity by a predetermined quantity according to a photometric wave detection capacity; and
adjusting, according to an external light luminance, the predetermined quantity by which the appropriate light emission quantity is decreased to obtain the second pre-light emission quantity.

16. A processing device, comprising:
a control unit configured to control a first process of obtaining a first pre-light emission quantity with no use of distance information, a second process of obtaining an appropriate light emission quantity with use of distance information and obtaining a second pre-light emission quantity by decreasing the appropriate light emission quantity by a predetermined quantity according to a photometric wave detection capacity, and a third process of obtaining a final pre-light emission quantity from the first pre-light emission quantity and the second pre-light emission quantity, on a basis of a ratio corresponding to an accuracy of the distance information used to obtain the appropriate light emission quantity.

* * * * *